(12) United States Patent
Johnson, Jr. et al.

(10) Patent No.: US 7,508,094 B2
(45) Date of Patent: Mar. 24, 2009

(54) UPS SYSTEMS HAVING MULTIPLE OPERATION MODES AND METHODS OF OPERATING SAME

(75) Inventors: Robert W. Johnson, Jr., Raleigh, NC (US); Rune Lennart Jonsson, Raleigh, NC (US); Ove Ohman, Espoo (FI); Joseph Charles Paulakonis, Chapel Hill, NC (US); Kevin Lee, Menomonee Falls, WI (US); Pasi Sakari Taimela, Raleigh, NC (US)

(73) Assignee: Eaton Corporation, Cleveland, OH (US)

( * ) Notice: Subject to any disclaimer, the term of this patent is extended or adjusted under 35 U.S.C. 154(b) by 130 days.

(21) Appl. No.: 11/378,200

(22) Filed: Mar. 17, 2006

(65) Prior Publication Data

US 2007/0216228 A1 Sep. 20, 2007

(51) Int. Cl.
*H02J 9/00* (2006.01)
(52) U.S. Cl. ...................................... 307/64
(58) Field of Classification Search .................. 307/64, 307/65
See application file for complete search history.

(56) References Cited

U.S. PATENT DOCUMENTS 5,210,685 A * 5/1993 Rosa ........................... 363/109

| 6,262,899 | B1 | 7/2001 | Raddi et al. |
| 6,295,215 | B1 * | 9/2001 | Faria et al. ..................... 363/37 |
| 6,314,007 | B2 | 11/2001 | Johnson, Jr. et al. |
| 6,400,586 | B2 | 6/2002 | Raddi et al. |
| 6,661,678 | B2 | 12/2003 | Raddi et al. |
| 6,906,933 | B2 | 6/2005 | Taimela |
| 7,050,312 | B2 * | 5/2006 | Tracy et al. .................... 363/37 |
| 2004/0145338 | A1 * | 7/2004 | Nakamura et al. .......... 318/801 |

FOREIGN PATENT DOCUMENTS

WO WO94/14228 6/1994

* cited by examiner

*Primary Examiner*—Albert W Paladini
*Assistant Examiner*—Michael Rutland Wallis
(74) *Attorney, Agent, or Firm*—Myers Bigel Sibley & Sajovec, P.A.

(57) ABSTRACT

A power supply system includes an AC input configured to be coupled to an AC source, an AC output configured to be coupled to a load, a UPS having an input coupled to the AC input and an output coupled to the AC output and a bypass circuit coupled between the AC input and the AC output and configured to open and close a bypass path therebetween. The system further includes a controller configured to control the UPS and the bypass circuit such that the UPS operates as an online UPS for a first input voltage magnitude condition at the AC input and as a standby UPS for a second input voltage magnitude condition at the AC input. A multi-mode converter may be coupled to a DC link of the UPS and configured to be selectively coupled to a battery and the AC input to respectively support battery conversion and current control at the AC input in respective first and second modes of operation of the UPS.

2 Claims, 6 Drawing Sheets

UPS SYSTEMS HAVING MULTIPLE OPERATION MODES AND METHODS OF OPERATING SAME

BACKGROUND OF THE INVENTION

The present invention relates to power supply apparatus and methods and, more particularly, to uninterruptible power supply (UPS) apparatus and methods.

Any of a variety of different architectures may be used in a UPS, including online, standby and line interactive architectures. Such UPS architectures are described, for example, in U.S. Pat. No. 6,314,007 to Johnson.

A typical on-line UPS includes a combination of a rectifier and inverter linked by a DC link. An AC utility source is typically coupled to the rectifier, which responsively produces a DC voltage on the DC link. The inverter typically generates an AC output voltage for a protected load from the DC voltage on the DC link. An ancillary DC power source is typically coupled to the DC link to provide power to the inverter in the event that the AC utility source fails.

Some online UPSs may include a bypass circuit, which may be used to directly couple the AC utility source to the load. The bypass circuit may be used, for example, for purposes of deactivating the rectifier and/or inverter for maintenance actions and/or to provide power to the load when the rectifier and/or inverter fails. Such a bypass circuit may also be used to provide a "high efficiency" mode of operation, as described, for example, in U.S. Pat. No. 6,295,215 to Faria et al. An online UPS may also provide power conditioning (e.g., power factor correction) in a bypassed mode using the inverter and/or rectifier, as described, for example, in U.S. Pat. No. 6,295,215 to Faria et al and U.S. Pat. No. 6,906,933 to Taimela.

A variety of techniques have been proposed for reducing input current harmonic distortion and/or improving power factor for a UPS. For example, PCT International Application Publication WO 94/14228 to Oughton describes techniques for operating a pulse width modulated (PWM) converter wherein occurrence of a notch portion of the input current to the converter is determined, control signals are generated in response to switch a plurality of bi-directional switches of the PWM converter so that the input current is modified only during the notch portion. The current may be modified to a generally sinusoidal shape so that the total harmonic distortion of the input current is limited. U.S. Pat. Nos. 6,262,899, 6,400,586 and 6,661,678 to Raddi et al. describe various power factor correction circuits for UPS systems.

SUMMARY OF THE INVENTION

In some embodiments of the present invention, a power supply system includes an AC input configured to be coupled to an AC source, an AC output configured to be coupled to a load, a UPS having an input coupled to the AC input and an output coupled to the AC output and a bypass circuit coupled between the AC input and the AC output and configured to open and close a bypass path therebetween. The system further includes a controller configured to control the UPS and the bypass circuit such that the UPS operates as an online UPS for a first input voltage magnitude condition at the AC input and as a standby UPS for a second input voltage magnitude condition at the AC input. The first voltage magnitude condition may include an input voltage at the AC input having a magnitude greater than a predetermined threshold, and the second input voltage magnitude condition may include the input voltage at the AC input having a magnitude less than the predetermined threshold. In some embodiments, the controller is configured to operate the UPS as a line current conditioner when the UPS is operating as a standby UPS.

In further embodiments of the present invention, the UPS may include a rectifier having an input coupled to the AC input, an inverter having an output coupled to the AC output, and a DC link coupling an output of the rectifier to an input of the inverter. The UPS may further include a battery coupled to the DC link, and the controller may be configured to cause the inverter to provide current to charge the battery when the UPS is operating as a standby UPS. The UPS may further include a converter coupling the battery to the DC link, and the controller be configured to operate the converter to control current at the input of the UPS when the UPS is operating as an online UPS. The controller may also be configured to cause the inverter to regulate an AC voltage at the AC output when the UPS is operating as an online UPS.

According to further aspects of the present invention, a UPS includes an AC input, an AC output, a diode bridge rectifier having an input coupled to the AC input, an inverter having an output coupled to the AC output, and a DC link coupling an output of the rectifier to an input of the inverter. The UPS may further include a multi-mode converter coupled to the DC link and configured to be selectively coupled to a battery and the AC input to respectively support battery conversion and current control at the AC input in respective first and second modes of operation of the UPS.

The multi-mode converter may be configured to conduct current at the AC input during selected periods of an AC voltage waveform at the AC input. The selected periods may include, for example, periods during which diodes of the diode bridge that couple the AC input to the DC link are reverse-biased. For example, the selected periods may include beginning and ending portions of half-cycles of the AC voltage waveform.

In further embodiments, the multi-mode converter includes a half-leg circuit including first and second transistors coupled in series between first and second busses of the DC link, an inductor coupled to a center tap of the half-leg circuit and configured to be coupled to the AC input and a controller configured to control the first and second transistors. In some embodiments, the controller may be configured to operate respective ones of the first and second switches in respective positive and negative half cycles of the input voltage at the AC input when the inductor is coupled to the AC input. In some embodiments, the controller may be configured to complementarily operate the first and second transistors during each of negative and positive half cycles of the input voltage at the AC input when the inductor is coupled to the AC input. The controller may be an open loop or closed loop controller.

Other embodiments of the present invention provide related methods of operating power supply systems and UPSs.

DETAILED DESCRIPTION

Figure 1:
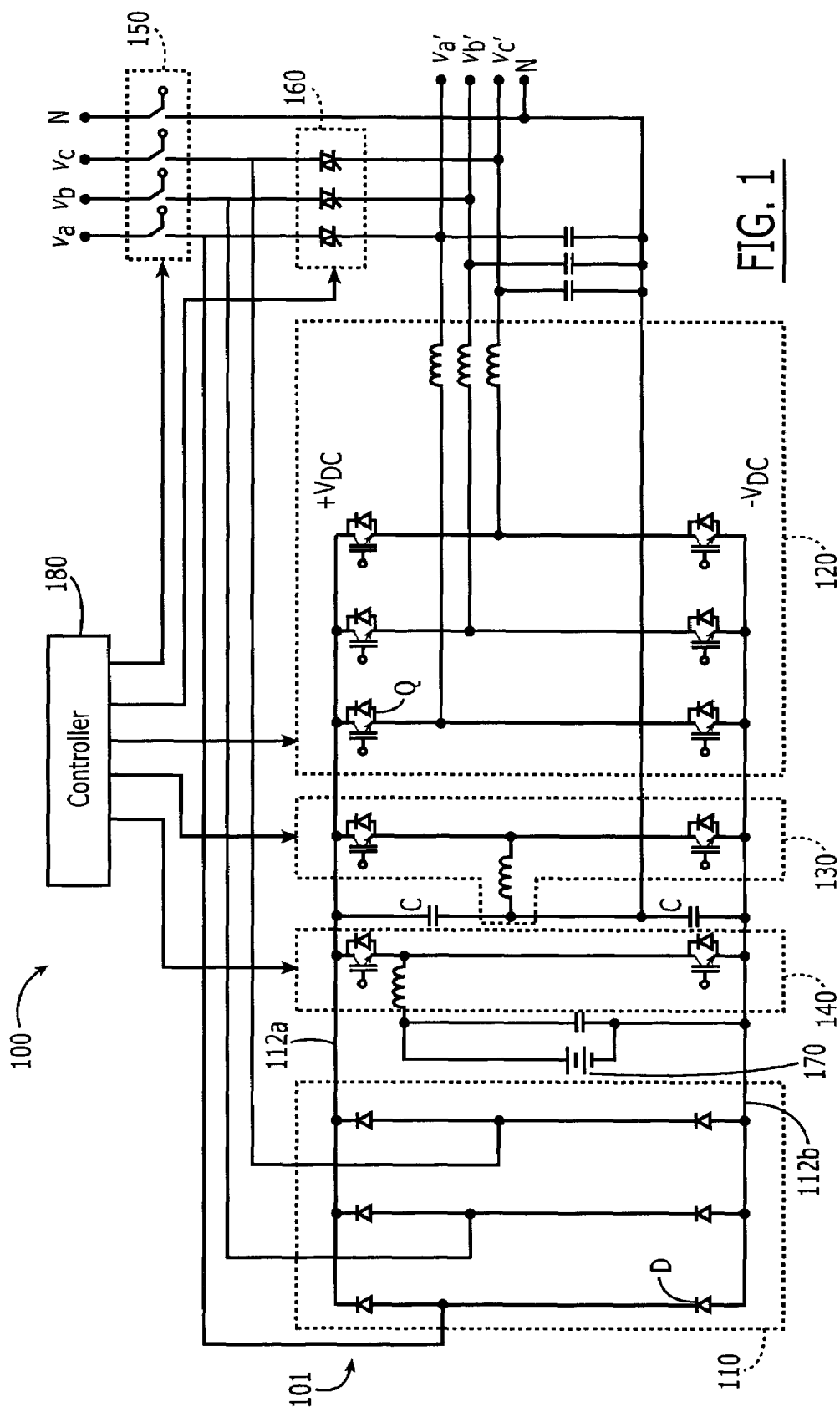
FIG. 1 illustrates power supply apparatus and methods according to various embodiments of the present invention.

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular exemplary embodiments illustrated in the accompanying drawings is not intended to be limiting of the invention. In the drawings, like numbers refer to like elements.

As used herein, the singular forms "a", "an" and "the" are intended to include the plural forms as well, unless expressly stated otherwise. It will be further understood that the terms "comprises," "includes," "comprising" and/or "including," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Some embodiments of the present invention arise from a realization that, in some applications, such as information technology (IT) applications, the loads powered by UPSs may have power supplies that are capable of power factor correction and/or are tolerant of relatively wide voltage and frequency variations. Therefore, such loads may not require voltage and frequency regulation over a fairly significant envelope of input voltages. However, such loads still may require backup power and voltage magnitude limitation, and may also benefit from line conditioning (e.g. harmonic suppression) even if their input voltage is not being tightly regulated.

In some embodiments of the present invention, a UPS system includes a UPS, a bypass circuit and a controller that controls the UPS and bypass circuit to provide an operational regime wherein the UPS operates as an online UPS under a first condition of an input voltage magnitude at the AC input and as a standby UPS under a second condition of the input voltage magnitude at the AC input. For example, the UPS may operate as an online UPS when the AC input voltage magnitude of an AC source connected thereto exceeds a threshold (e.g., a limit related to a maximum operating voltage of the load connected to the UPS), and the UPS may operate as a standby UPS when the AC input voltage magnitude is less than this threshold. When operating from the AC source in the online mode, the UPS may operate to limit the voltage applied to the load. Using such an approach, it may be possible to provide higher power density greater efficiency, as the system may operate in a more efficient standby mode over a relatively large range of input voltage conditions. While powering the load on bypass from the AC source in the standby mode, an inverter of the UPS may be used to provide line conditioning and/or to provide charging current to the battery of the UPS.

FIG. 1 illustrates an UPS system 100 according to some embodiments of the present invention. The system 100 includes a UPS 101 including a rectifier 110 (a diode bridge including a plurality of diodes D), an inverter 120 (including a plurality of insulated gate bipolar transistors (IGBTs) Q arranged in half-bridge circuits), a balancer circuit 130, a battery converter 140 and a battery 170. The rectifier 110 is configured to produce positive and negative DC voltages $+V_{DC}$, $-V_{DC}$ on a DC link (rails) 112a, 112b (e.g., by charging storage capacitors C) responsive to AC voltages applied to an input of the rectifier 110. The inverter 120, under control of a controller 180, is configured to generate AC output voltages $v'_a$, $v'_b$, $v'_c$ from the DC voltages $+V_{DC}$, $-V_{DC}$. Under control of the controller 180, the balancer circuit 130 regulates relative magnitudes of the DC voltages $+V_{DC}$, $-V_{DC}$. The battery converter 140 provides power to the DC link 112a, 112a from the battery 170 in a battery-powered mode of operation, and also is operative to provide charging current from the DC link 112a, 112b to charge the battery 170. The system 100 further includes a bypass circuit 160 (here shown as including a plurality of semiconductor switches SCR), which is also controlled by the controller 180. A contactor (relay) 150 is configured to couple and decouple the system 100 to and from an AC power source, here a three-phase utility source with phase voltages $v_a$, $v_b$, $v_c$, under control of the controller 180.

According to some embodiments of the present invention, the controller 180 may be configured to control the UPS 101 and the bypass circuit 160 to provide and operational regime wherein the UPS 101 operates as an online UPS under a first magnitude condition of the AC input voltages $v_a$, $v_b$, $v_c$, and as a standby UPS under a second magnitude condition of the input voltage $v_a$, $v_b$, $v_c$. For example, when a magnitude of the input voltages $v_a$, $v_b$, $v_c$ is less than a predetermined threshold, for example, a threshold set to be near or less than a voltage magnitude limit for a load coupled to the inverter 120, power may be provided to the load by closing the bypass path through the bypass circuit 160, such that the AC input of the system 100 is directly coupled to the load. In this operational mode, the UPS 101 can act as a "standby" UPS, i.e., the UPS 101 stands ready to supply power to the load from the battery 170, but does not regulate the voltages $v'_a$, $v'_b$, $v'_c$ applied to the load, i.e., the inverter 120 does not regulate the output voltages $v'_a$, $v'_b$, $v'_c$.

When supplying power from the AC source $v'_a$, $v'_b$, $v'_c$ in this standby mode, the controller 180 may operate the inverter 120 as a line conditioner, for example, in a manner similar to that described in the aforementioned U.S. Pat. No. 6,906,933 to Taimela, the disclosure of which is incorporated by reference herein in its entirety. In addition, while operating from the AC source $v_a$, $v_b$, $v_c$ in the standby mode, the controller 180 may also use the inverter 120 to supply current to the DC link 112a, 112b and, thus, provide charging current to the battery converter 140 for charging of the battery 170. In the event of failure of the AC input, the controller 180 may open the bypass path using the bypass circuit 160 and begin generating the AC output voltages $v'_a, v'_b, v'_c$, from the battery 170 using the battery converter 140 and the inverter 120.

Responsive to a voltage magnitude of the AC input voltages $v_a, v_b, v_c$ exceeding the aforementioned threshold while the UPS system 101 is in the standby mode, the controller 180 may transition to operating the UPS 101 in an online mode. In particular, the controller 180 may open the bypass path using the bypass circuit 160, and may start generating the output voltages $v'_a, v'_b, v'_c$ from the DC voltages $+V_{DC}, -V_{DC}$ using the inverter 120. In particular, in the online mode, the controller 180 may operate the inverter 120 such that the output voltages $v'_a, v'_b, v'_c$ are maintained at a desirable level below the threshold. While in this online mode, in response to a failure of the AC input to the rectifier 110, the controller 180 may directly transition to battery-powered operation without re-closing the bypass circuit 160. If the AC input returns, but at a level below the aforementioned threshold, the controller may close the bypass circuit 160 and transition the UPS 101 to the standby mode of operation. If the AC input returns at a level above the threshold, the controller 180 may maintain the UPS in the online mode.

It will be appreciated that, while FIG. 1 illustrates a three-phase configuration, the present invention also includes single-phase embodiments. A single-phase embodiment may, for example, use an inverter with a single half-bridge and a rectifier with a single full or half-bridge. It will be understood that the controller 180 may be implemented using any of a variety of different types of circuitry, including analog circuitry, digital circuitry (e.g., a microprocessor or microcontroller) or combinations thereof.

Figure 2:
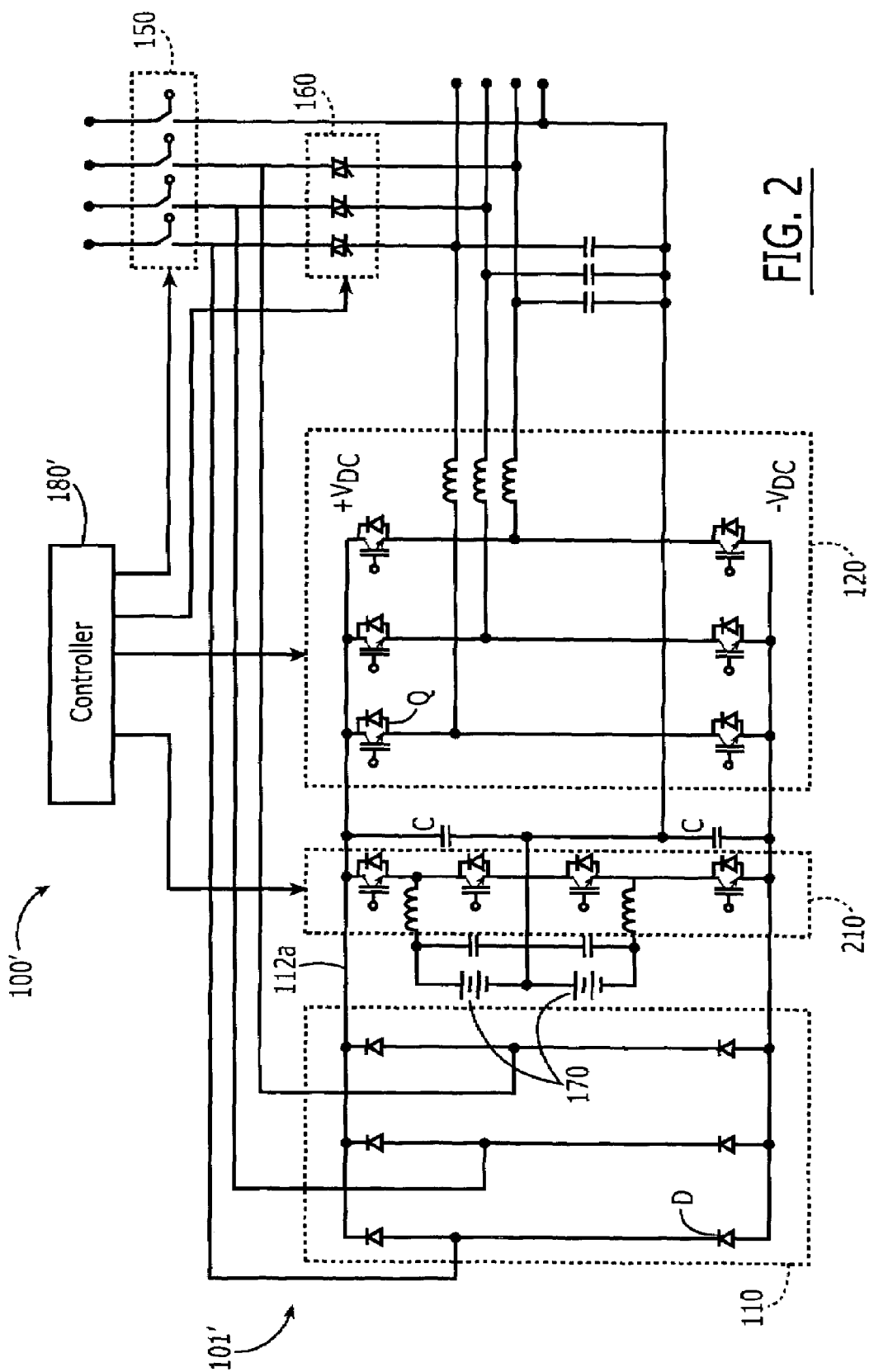
FIG. 2 illustrates power supply apparatus and methods according further embodiments of the present invention.

FIG. 2 illustrates a UPS system 100' according to further embodiments of the present invention. The system 100' includes many components shown in the system 100 of FIG. 1, with like components indicated by like reference numerals. The system 100' differs in that it includes a UPS 101' wherein the balancer circuit 130 and the battery converter 140 of FIG. 1 are replaced by a combined battery converter/balancer 210, under control of a modified controller 180'. It will be understood that the system 100' may be operated in a manner similar to that described above with reference to FIG. 1.

According to further embodiments of the present invention, in a UPS having a diode bridge rectifier, such as the rectifier 110 illustrated in FIG. 1, a multi-mode converter circuit may provide respective battery converter and input current control functions in respective first and second modes. In particular, in some embodiments of the present invention, the multi-mode converter may be configured to conduct current at the AC input of the rectifier during selected periods of an AC voltage waveform at the AC input when the rectifier and inverter of the UPS are operating in an online mode. The selected periods may be periods during which diodes of the diode bridge that couple the AC input to the DC link are reverse-biased. The selected periods may be beginning and ending portions of half-cycles of the AC voltage waveform. Using such a converter, crest factor, current harmonics (e.g., total harmonic distortion (THD)) and/or neutral current may be reduced and input power factor may be increased, without requiring an undue number of additional parts.

Figure 3:
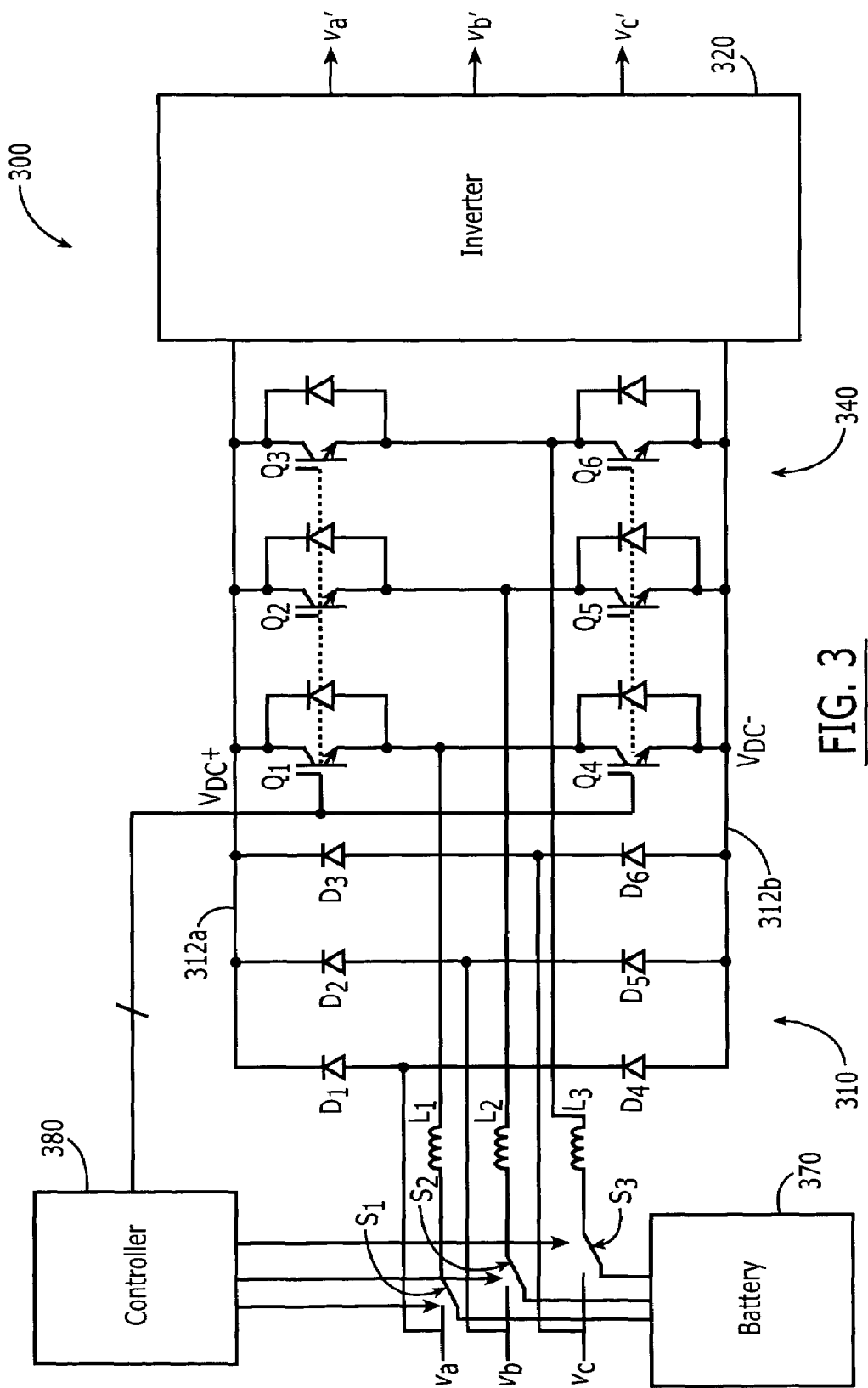
FIG. 3 illustrates a UPS including a multi-mode converter for battery conversion and input current control according to additional embodiments of the present invention.

FIG. 3 illustrates a UPS 300 according to further embodiments of the present invention. The UPS 300 may be included in a UPS system along the lines of the UPS systems 100, 100' of FIGS. 1 and 2. The UPS 300 includes a diode bridge rectifier 310 including diodes $D_1, D_2, \ldots, D_6$. The UPS 300 also includes an inverter 320 coupled to the rectifier 310 by a DC link (rails) 312a, 312b. The rectifier 310 and inverter 320 may operate as described above.

The UPS 300 further includes a multi-mode converter 340 including insulated gate bipolar transistors (IGBTs) $Q_1, Q_2, \ldots, Q_6$ arranged as three parallel half-bridges, respective ones of which are coupled to respective input inductors center taps $L_1, L_2, L_3$. The transistors $Q_1, Q_2, \ldots, Q_6$ are controlled by a controller 380, which also controls a plurality of switches $S_1, S_2, S_3$ that selectively couple the respective inductors $L_1, L_2, L_3$ to a battery 370 and an input of the UPS where AC input voltages $v_a, v_b, v_c$, are applied.

In a first mode of operation, in particular, when the AC input has failed and the DC link voltages $+V_{DC}, -V_{DC}$ are being supported by the battery 370, the switches $S_1, S_2, S_3$ couple the inductors $L_1, L_2, L_3$ to the battery 370, and the controller 380 operates the multi-mode converter 340 as a battery converter to produce output voltages $v'_a, v'_b, v'_c$. In a second mode of operation, i.e., when the AC input voltages $v_a, v_b, v_c$ are acceptable and the rectifier 310 is providing current to the DC link 312a, 312b, the controller 380 causes the switches $S_1, S_2, S_3$ to couple the inductors $L_1, L_2, L_3$ to the input of the UPS 300 and operates the multi-mode converter 340 to control input current at the input of the UPS 300, so that, for example, the input current may be shaped to provide better performance (e.g., reduced distortion and/or improved power factor).

Figure 4:
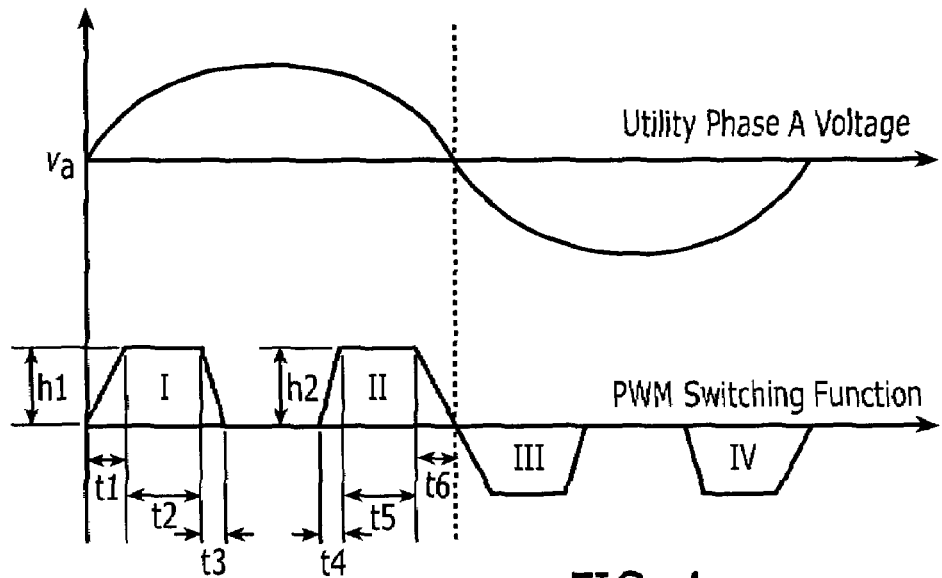
FIGS. 4-6 illustrate exemplary operations of a multi-mode converter for battery conversion and input current control according to additional embodiments of the present invention.

In particular, in some embodiments, the converter 340 may be used to conduct current at selected portions of the input voltage waveform, while using the diodes of the rectifier 310 to conduct current during other portions of the input voltage waveform. Referring to FIG. 4, which shows control for phase A, the transistors Q1, Q4 may be pulse width modulated during sectors I, II, III, IV during half-cycles of the phase A voltage $v_a$ to provide controlled current flow at the input of the UPS 300 during, for example, portions of the AC input voltage waveform in which the phase A diodes $D_1, D_4$ are reversed-biased and, thus, non-conducting. In central portions of the voltage half cycles, the converter 340 may be deactivated (i.e., turn both $Q_1$ and $Q_4$ off) and, during this interval, current may flow through the phase A diodes $D_1, D_4$ during periods in which the magnitude of the input phase A voltage $v_a$ exceeds the magnitude of the corresponding positive or negative DC link voltage $+V_{DC}, -V_{DC}$ and the diodes $D_1, D_4$ are forward biased. Under light loading, the sectors I, II, III, IV may merge.

Still referring to FIG. 4, controllable variables for the sectors I, II, III, IV include peak currents h1, h2, duration of ramp-up and ramp-down periods t1, t3, t4, t6, and duration of controlled current magnitude periods t2, t5. Current during one of these periods, such as the ramp-up period t1, the controller 380 may cause the input current to conform to a line or curve with a desired prescription. The variables may be determined by load, inductor rating, and other parameters. The controller 380 may operate the converter 340 using open loop and/or closed loop techniques, e.g., the controller 380 may operate responsive to the input voltage and current sensed in the input inductor (e.g., inductor $L_1$). It will be understood that the controller 380 may be implemented using any of a variety of different types of circuitry, including analog circuitry, digital circuitry (e.g., a microprocessor or microcontroller) or combinations thereof.

Figure 5:
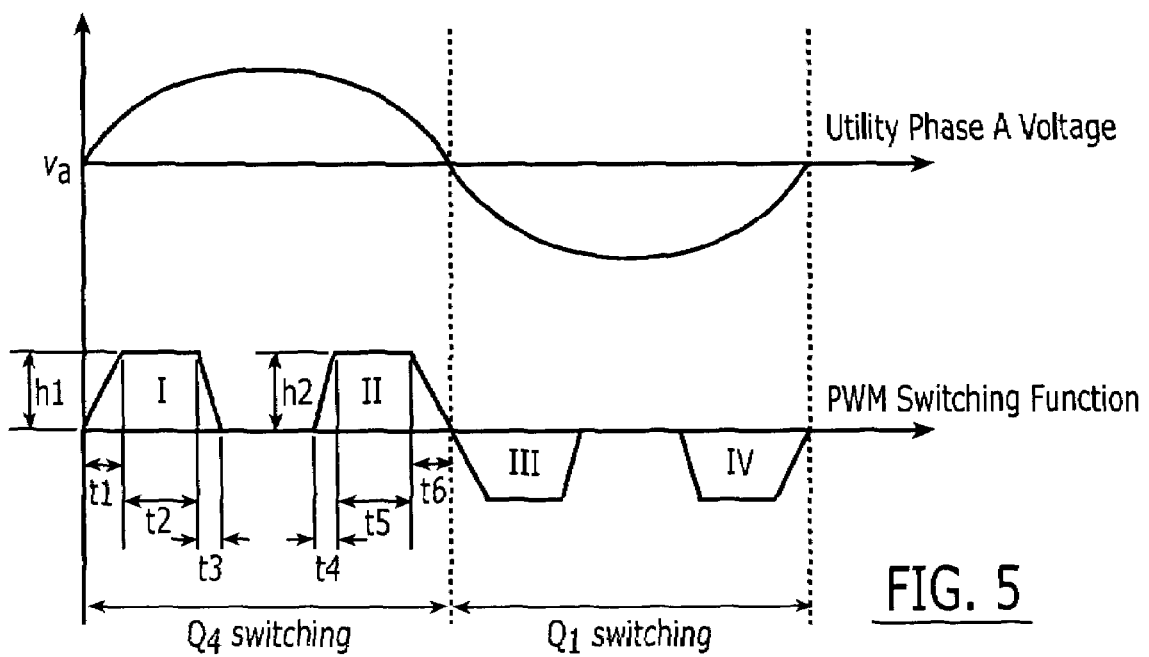

In some embodiments of the present invention, current control by a converter along the lines of the converter 340 may be achieved using a "unipolar" switching regime. Referring to FIG. 5 in combination with FIG. 3, during a positive half cycle of the phase A voltage $v_a$, the lower transistor $Q_4$ is modulated while keeping the upper transistor $Q_1$ off. During this half-cycle, when the lower transistor $Q_4$ is turned on, current builds up through the inductor $L_1$. When the lower transistor $Q_4$ is turned off, current flows to the upper DC rail 312a via the body diode of the upper transistor $Q_1$ and/or the rectifier diode $D_1$. During the negative half-cycle of the phase A voltage $v_a$, the upper transistor $Q_1$ is modulated while keeping the low transistor $Q_4$ off. During this half-cycle, when the upper transistor $Q_1$ is turned on, current builds up through the boost inductor $L_1$. When the upper transistor $Q_1$ is turned off, current flows from the lower DC rail 312b via the body diode of the lower transistor $Q_4$ and/or the rectifier diode $D_4$. It will be appreciated that similar operations may be performed for phases B and C.

Figure 6:
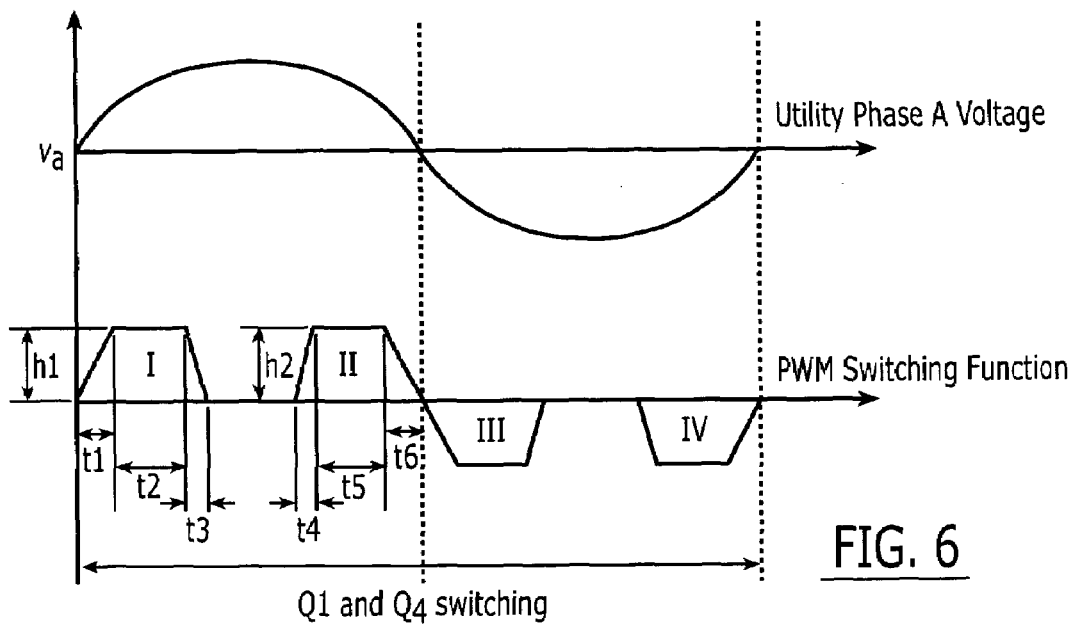

In further embodiments of the present invention, current control by a converter along the lines of the converter 340 may be achieved using a "complementary" switching regime. Referring to FIG. 6 in relation to FIG. 3, during a positive half cycle of the phase A voltage $v_a$, the lower transistor $Q_4$ and the upper transistor $Q_1$ are complementarily modulated. During this half-cycle, when the lower transistor $Q_4$ is turned on, current builds up through the boost inductor $L_1$. When the lower transistor $Q_4$ is turned off and the upper transistor $Q_1$ is turned on, current flows to the upper DC rail 312a via the upper transistor $Q_1$. Similarly, during the negative half-cycle of the phase A voltage $v_a$, the upper transistor $Q_1$ and the lower transistor $Q_4$ are complementarily modulated. During this half-cycle, when the upper transistor $Q_1$ is turned on, current builds up through the inductor $L_1$. When the upper transistor $Q_1$ is turned off and the lower transistor $Q_4$ is turned on, current flows to the lower DC rail 312b via the lower transistor $Q_4$.

Figure 7:
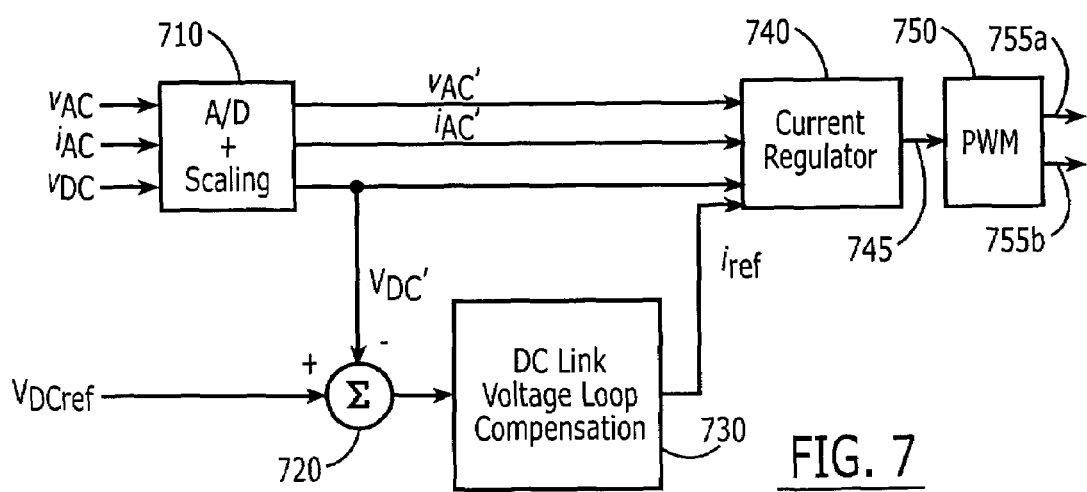
FIGS. 7-8 illustrate control architectures for a multi-mode converter for battery conversion and input current control according to additional embodiments of the present invention.
Figure 8:
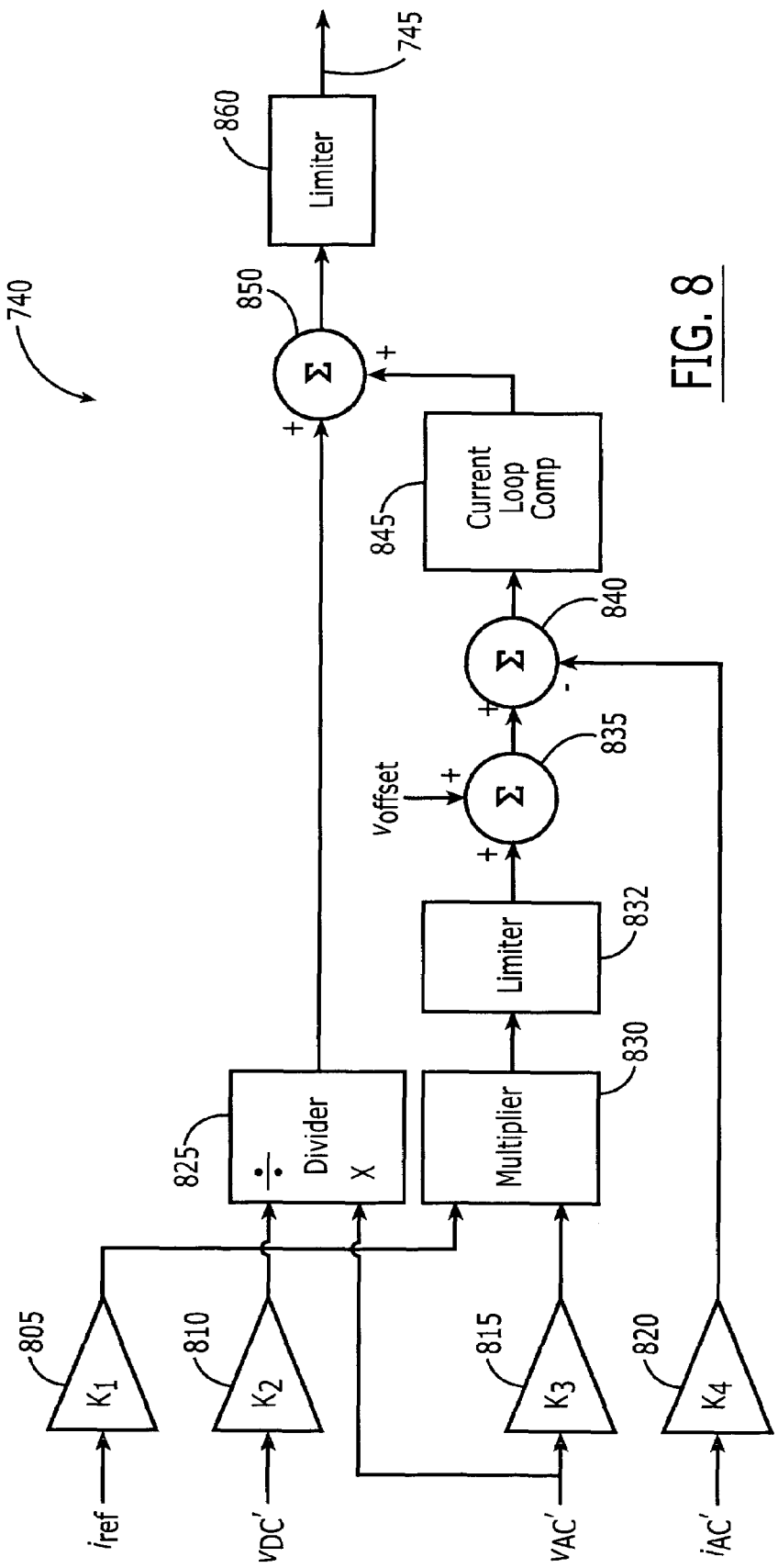

FIGS. 7 and 8 illustrate exemplary closed-loop control structures for current control using a complementary switching techniques along the lines described above according to further embodiments of the present invention. Referring to FIG. 7, a pulse width modulation control loop includes input analog to digital (A/D) and scaling circuitry 710, which receives phase voltage, phase current and DC link voltage signals $v_{AC}$, $i_{AC}$, $V_{DC}$ and generates corresponding digital phase voltage, phase current and DC link voltage signals $v_{AC}'$, $i_{AC}'$, $V_{DC}'$. The digital DC link voltage signal $V_{DC}'$ is provided to a summing junction 720, where it is compared with a DC link voltage reference signal $V_{DCref}$. The error signal generated from the comparison is applied to a DC link voltage loop compensator 730, which responsively generates a current reference signal $i_{ref}$ that is provided to a current regulator 740. The current regulator 740 also receives the digital phase voltage, phase current and DC link voltage signals $v_{AC}'$, $i_{AC}'$, $V_{DC}'$. Responsive to these inputs, the current regulator 740 generates a pulse-width modulation command signal 745 that is provided to a pulse-width modulator (PWM) 750. The PWM 750 responsively generates control signals 755a, 755b, which may be drive signals applied, for example, to upper and lower transistors of a half-leg circuit of a converter, such as the converter 340 of FIG. 3. It will be appreciated that a control structure along the lines shown in FIG. 7 may be provided for each phase in multi-phase applications.

FIG. 8 illustrates an exemplary configuration for the current regulator 740. The current regulator 740 includes gain blocks 805, 810, 815, 820 that receive respective ones of the input digital phase voltage, phase current and DC link voltage signals $v_{AC}'$, $i_{AC}'$, $V_{DC}'$ and the current reference signal $i_{ref}$. Scaled versions of the input digital phase voltage and DC link voltage signals $v_{AC}'$, $V_{DC}'$ are applied to a divider 825, producing a signal that is applied to a summing junction 850. Scaled versions of the input digital phase voltage signal $v_{AC}'$ and the current reference signal $i_{ref}$ are provided to a multiplier 830, which produces a reference signal that is applied to a limiter 832, which produces a limited signal that is applied to a summing junction 835. At the summing junction 835, and offset signal $v_{offset}$ is added, and the resulting signal is provided to another summing junction 840, where it is compared with a scaled version of the phase current signal $i_{AC}'$. The error signal produced by the summing junction 840 is provided to a current loop compensator 845, which produces a command signal that is summed with the output of the divider 825 at the summing junction 850. The composite command signal produced by the summing junction 850 is limited by a limiter 860, producing the pulse-width modulation command signal 745.

The control architectures shown in FIGS. 7 and 8 are provided for purposes of illustration, and it will be appreciated that other closed-loop and open-loop control structures may be used in other embodiments of the present invention. It will be further appreciated that control structures for embodiments of the present invention may be implemented using any of a variety of different types of electronic circuits, including analog circuits, digital circuits (e.g., microprocessors and microcontrollers), and combinations thereof. Embodiments of the present invention include single-phase and multi-phase implementations.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed is:

1. A power supply system comprising:
   an AC input configured to be coupled to an AC source;
   an AC output configured to be coupled to a load;
   a UPS having an input coupled to the AC input and an output coupled to the AC output, wherein the UPS comprises a rectifier having an input coupled to the AC input, an inverter having an output coupled to the AC output, a DC link coupling an output of the rectifier to an input of the inverter, and a battery coupled to the DC link;
   a bypass circuit coupled between the AC input and the AC output and configured to open and close a bypass path therebetween; and
   a controller configured to control the UPS and the bypass circuit such that the UPS operates as an online UPS for a first input voltage magnitude condition at the AC input and as a standby UPS for a second input voltage magnitude condition at the AC input, wherein the controller is configured to operate the UPS as an online UPS by transferring power from the AC input to the AC output via the rectifier and the inverter in a first online UPS operation state and transferring power from the battery to the AC output via the inverter in a second online UPS operation state, and wherein the controller is configured to operate the UPS as a standby UPS by transferring power from the AC input to the AC output via the bypass circuit in a first standby UPS operation state and transferring power from the battery to the AC output via the inverter in a second standby UPS operation state.

2. A method of operating a power supply system including an AC input configured to be coupled to an AC source, an AC output configured to be coupled to a load, a UPS having an input coupled to the AC input and an output coupled to the AC output, and a bypass circuit coupled between the AC input and the AC output and configured to open and close a bypass path therebetween wherein the UPS comprises a rectifier having an input coupled to the AC input, an inverter having an output coupled to the AC output, a DC link coupling an output of the rectifier to an input of the inverter, and a battery coupled to the DC link, the method comprising:

controlling the UPS and the bypass circuit such that the UPS operates as an online UPS for a first input voltage magnitude condition at the AC input and as a standby UPS for a second input voltage magnitude condition at the AC input, wherein controlling the UPS and the bypass circuit such that the UPS operates as an online UPS for a first input voltage magnitude condition at the AC input and as a standby UPS for a second input voltage magnitude condition at the AC input comprises:

operating the UPS as an online UPS by transferring power from the AC input to the AC output via the rectifier and the inverter in a first online UPS operation state and transferring power from the battery to the AC output via the inverter in a second online UPS operation state; and operating the UPS as a standby UPS by transferring power from the AC input to the AC output via the bypass circuit in a first standby UPS operation state and transferring power from the battery to the AC output via the inverter in a second standby UPS operation state.

* * * * *